Jan. 5, 1965  J. E. NIELSEN  3,164,008
APPARATUS FOR MEASURING ELONGATION
Filed Oct. 5, 1959  5 Sheets-Sheet 1
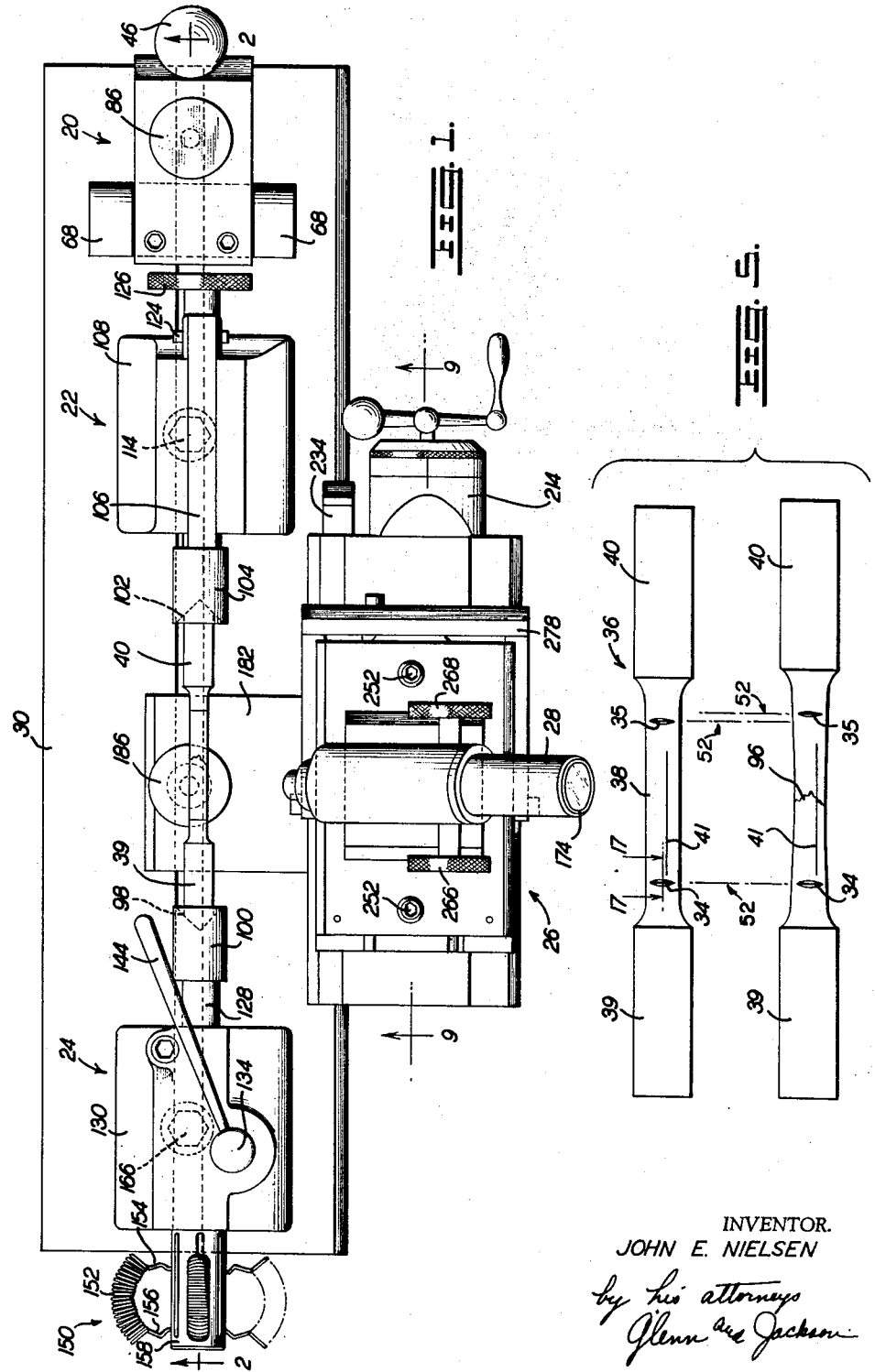
INVENTOR.
JOHN E. NIELSEN
by his attorneys
Glenn and Jackson

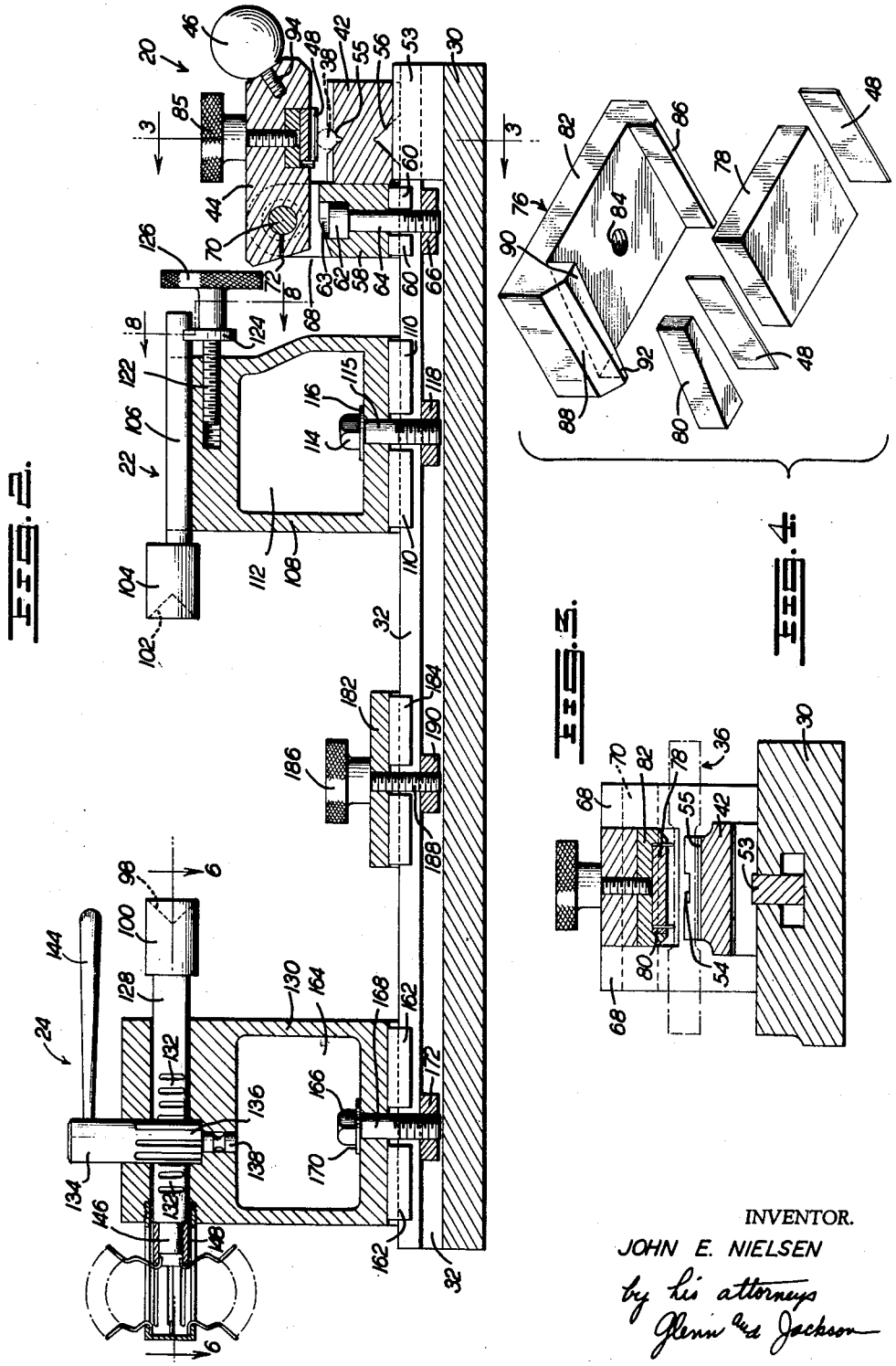

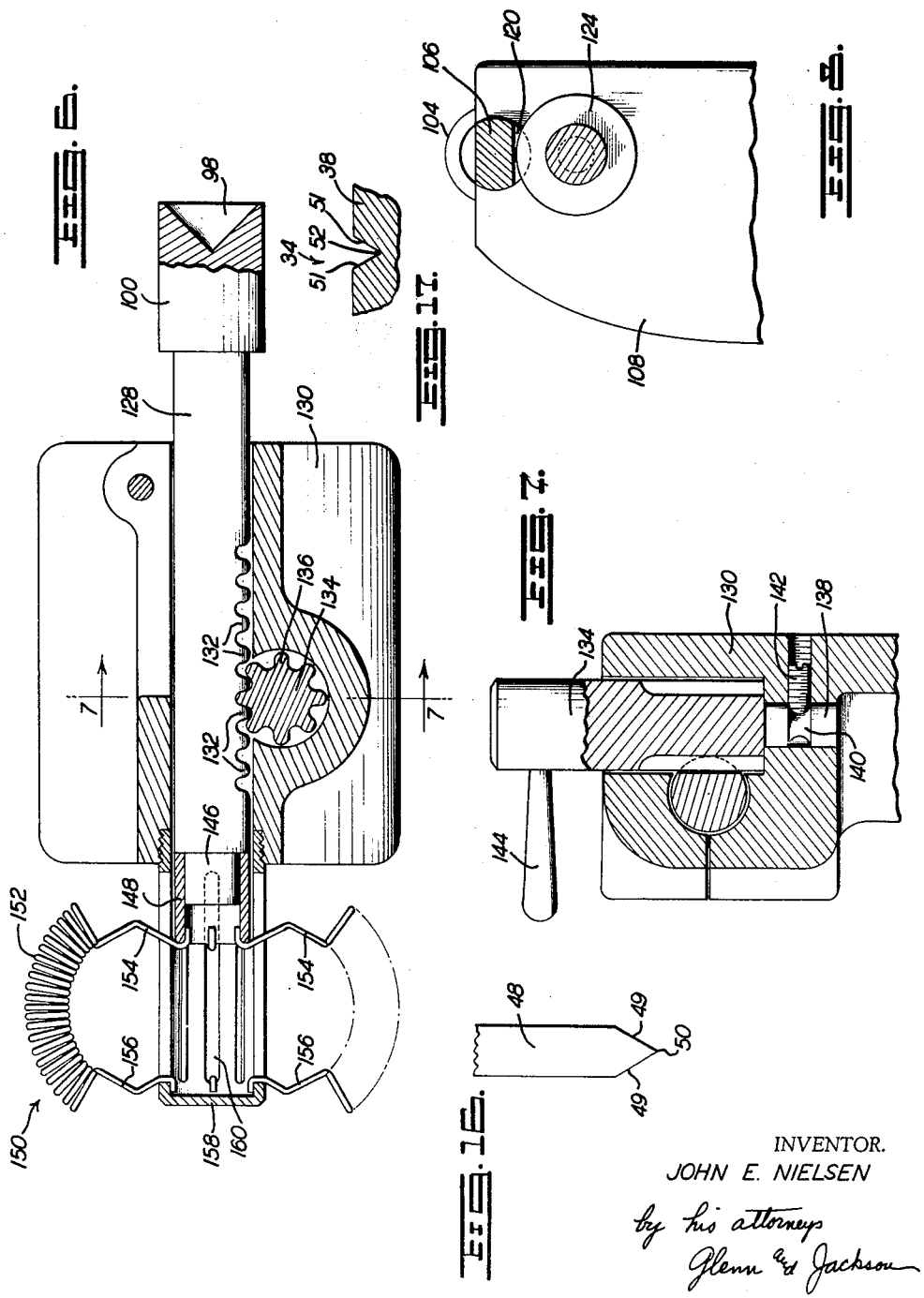

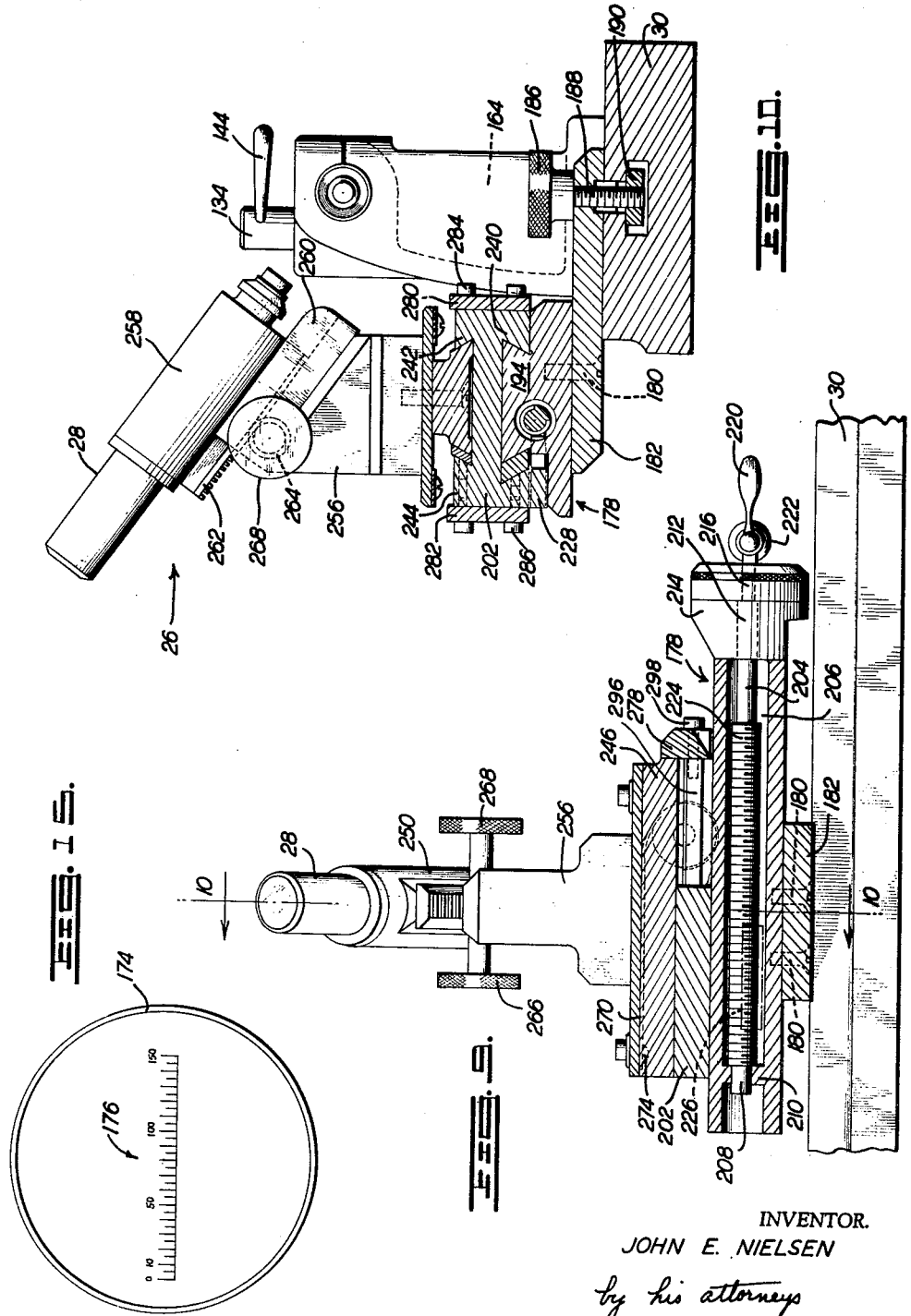

Jan. 5, 1965    J. E. NIELSEN    3,164,008
APPARATUS FOR MEASURING ELONGATION
Filed Oct. 5, 1959    5 Sheets-Sheet 5
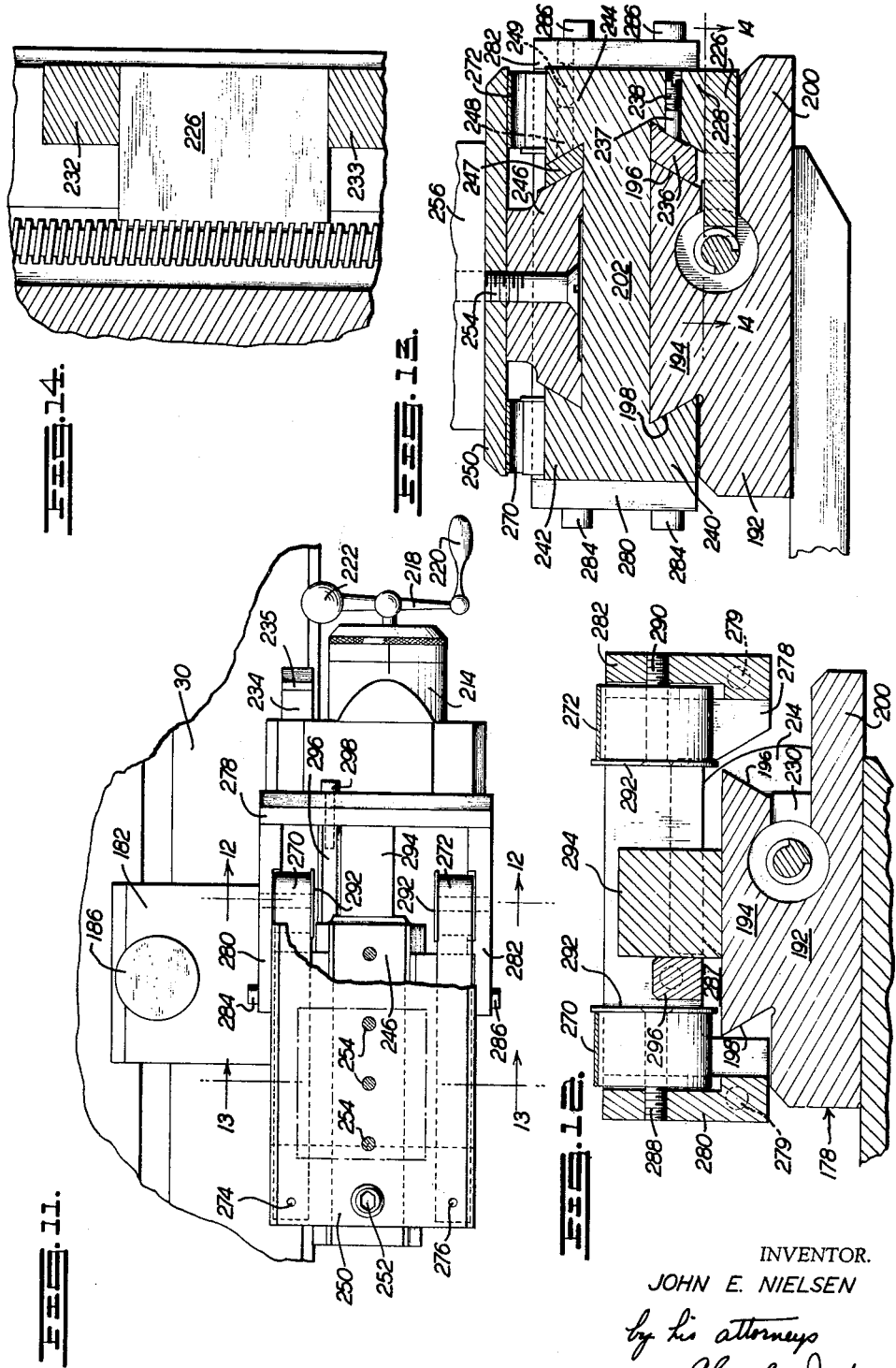
INVENTOR.
JOHN E. NIELSEN
by his attorneys
Glenn and Jackson

United States Patent Office 3,164,008
Patented Jan. 5, 1965

3,164,008
APPARATUS FOR MEASURING ELONGATION
John E. Nielsen, Downers Grove, Ill., assignor to Reynolds Metals Company, Richmond, Va., a corporation of Delaware
Filed Oct. 5, 1959, Ser. No. 844,469
3 Claims. (Cl. 73—88)

This invention relates to measuring elongation of specimens of material. Elongation may be defined as the linear stretch of a material during tensile loading, or, conversely, the linear shrinkage of a material during compressive loading. Two gauge marks are placed on the specimen before loading. The specimen is then stretched or compressed until it fractures. The increase, or decrease, in the distance between the marks, expressed in percent, resulting from stressing the specimen to fracture or failure, is elongation.

More particularly, this invention relates to apparatus and method for measuring the elongation of specimens of material.

In the manufacture of material such as metal rods and plates, the end use of the material frequently requires that the material have specified mechanical properties. Among such properties is the amount of elongation that will be produced on the material by an applied load or stress.

In order that a manufacturer or user can determine whether a specimen meets the specified standards, it is desirable to determine the amount of elongation produced by a force applied to the specimen.

Heretofore, devices have been provided for measuring the amount of elongation of a specimen of material, such as iron or steel bars or rods, concrete blocks, et cetera, that has been subjected to a stress producing a strain.

It is known to employ a calibrated scale and dividers to measure such elongation. A dimension of the specimen has been measured, with the scale and dividers, before and after elongation. The difference between the two measurements, expressed as a percentage of the original measurement, is the elongation. This method has been found to be inaccurate for measuring short elongations, particularly where the elongation is 2 to 3 percent of the initial length of the specimen.

Previously, microscopes have been employed in some extensometers. In some such prior devices, a pair of microscopes have been sighted on spaced marks on the specimen before applying a load. After the load is applied, both microscopes have been moved as a unit so that one microscope again sights on one of the marks. The other microscope is then moved to sight on the other mark and the amount of movement of this microscope gives the extension of the specimen. The process is lengthy and requires two microscopes.

This invention resides in the concept of apparatus and method for accurately and conveniently measuring the elongation of specimens subjected to stress. The apparatus of the invention includes a marker for making a pair of precisely-spaced indentations or markings on a specimen prior to elongation. Apparatus is provided for matching or mating the broken pieces of a marked specimen that has been fractured in tension or compression. A reading device is provided wherein a microscope is sighted directly at the fractured specimen and the amount of elongation read directly on a graticule in the eyepiece of the microscope.

The marker of the invention has flexibility in that its parts are interchangeable and replaceable to accommodate specimens of various sizes and to place two indentations or markings at different distances from each other on the specimen.

When a specimen of material has been elongated until it fractures in tension or compression, and it is desired to measure the elongation, it is necessary to match the broken surfaces so as to obtain an accurate measurement. Another advantage of the invention is that it provides apparatus for matching the broken surfaces of broken pieces of a specimen by delivering a blow of selectively-controlled force to the pieces so as to press the broken pieces into mating engagement. The force of the blow is variable depending on the size of the specimen, but constant for specimens of the same size.

The apparatus of the invention can be operated with speed and accuracy. A number of successive elongation readings can be rapidly made with the apparatus because the amount of elongation can be read directly from the graticule in the microscope without subsequent computations.

For a better understanding of the invention and its other objects, advantages and details, reference is now made to the present preferred embodiment of the invention which is shown, for purposes of illustration only, in the accompanying drawings.

In the drawings:

FIG. 1 is a top plan view of the present preferred embodiment of the invention and showing a marker for placing spaced indentations or markings on a specimen prior to elongation, holders for matching and firmly gripping the broken pieces of the specimen fractured in tension or compression, and a reading device wherein the microscope reads directly the amount of elongation of the fractured specimen;

FIG. 2 is a longitudinal vertical section taken on line 2—2 in FIG. 1, with the specimen removed, and showing details of the marker and holders;

FIG. 3 is a transverse vertical section along the line 3—3 in FIG. 2 and showing details of the marker for placing two spaced indentations or marks on a specimen before elongation;

FIG. 4 is an exploded perspective view of some parts of the marker shown in FIG. 3;

FIG. 5 is an elevation view of a specimen, shown in the upper portion of the figure, with indentations marked thereon by the marker shown in FIGS. 1 to 4; and shown in the lower portion of the figure after the specimen has been fractured in tension and the broken pieces have been mated;

FIG. 6 is a partial horizontal section taken along the line 6—6 in FIG. 2 and showing details of the mechanism for matching the broken pieces of the specimen fractured in tension or compression;

FIG. 7 is a fragmentary transverse vertical section taken along the line 7—7 in FIG. 6 and showing the handle for operating the matching mechanism illustrated in FIG. 6;

FIG. 8 is a fragmentary transverse vertical section taken along the line 8—8 in FIG. 2 and showing the mechanism for adjusting the holder opposite the holder shown in FIG. 6;

FIG. 9 is a longitudinal vertical section along the line 9—9 in FIG. 1 showing mechanism for moving the microscope to sight at one of the indentations on the matched fractured specimen;

FIG. 10 is a side view partially in section taken along line 10—10 of FIG. 9 showing the microscope and details of the manner in which it is attached to the base;

FIG. 11 is a fragmentary top plan view, with the microscope removed, of the mechanism for gauging the amount of movement of the microscope to equal the initial distance between the indentations on the specimen placed by the marker;

FIG. 12 is a vertical transverse section along the line

12—12 in FIG. 11 and showing details of the mechanism for moving the microscope and for gauging the movement of the microscope;

FIG. 13 is a transverse vertical section along the line 13—13 in FIG. 11 and showing the support for the microscope and portions of the mechanism for its movement;

FIG. 14 is a fragmentary horizontal section on the line 14—14 in FIG. 13 and showing portions of the mechanism for moving the microscope support;

FIG. 15 is a view through the eyepiece of the microscope showing the graticule on a lens in the focal plane;

FIG. 16 is a fragmentary elevation, on an enlarged scale, of one of the two marking knives employed in the marker shown in FIG. 4; and, FIG. 17 is a fragmentary section, on an enlarged scale, taken along the line 17—17 in FIG. 5 and showing the shape of an indentation formed in the specimen of material.

The present preferred embodiment illustrated in the drawings includes a marker 20 for placing two spaced indentations on a specimen prior to elongation, and an extending machine (not shown) of conventional type for grasping both ends of the specimen in jaws and moving the jaws apart to develop tensile stress in the specimen and elongate the specimen until the specimen fractures into two pieces. A holder 22 cooperates with an oppositely-disposed holder 24 to match the mated broken pieces of the fractured specimen by delivering an axial blow of controlled force to the mated broken pieces.

An elongation reader 26 includes mechanism for moving a microscope 28 so that a zero indicium in the eyepiece is aligned with one indentation on the matched fracture specimen. Mechanism is also contained in the reader for further moving the microscope along the specimen a gauged distance equal to the initial distance between the indentations when originally placed by the marker 20; whereby the operator can read the elongation of the specimen directly on a graticule in the eyepiece of the microscope.

To serve as a support for the marker 20, specimen holders 22 and 24, and elongation reader 26, a base 30 is provided having a T-shaped slot 32 formed in its top surface and extending between both ends thereof.

The marker 20 is adapted to place two spaced indentations 34 and 35 on a specimen 36 as seen in the upper portion of FIG. 5. The specimen is a rod of metal, such as aluminum, steel, or the like, having a diminished center portion 38 and two enlarged end portions 39 and 40.

To assist in matching the broken pieces of the specimen, a longitudinal line 41 is drawn in red ink on the specimen.

Referring to FIGS. 1, 2, 3, and 4, the marker 20 includes a marking anvil 42 having V-shaped notches formed therein in which the specimen 36 rests. A marking arm 44 is pivotally secured at one end and has a lifting knob 46 mounted on its opposite end. Two marking knives 48 extend from the lower surface of the marking arm 44.

Referring to FIG. 16, each marking knife 48 has two beveled surfaces 49 shaped, as by lapping, to an included angle therebetween of 60 degrees. The surfaces 49 coonverge to form an edge 50. The marking arm 44 can be raised by manually lifting knob 46. When the knob is released, the marking arm 44 falls by the force of gravity and the marking knives 48 strike the specimen and form triangular-shaped indentations 34 and 35 in its surface.

Referring to FIG. 17, each indentation 34 and 35, formed by marking knives 48, includes two faces 51 converging to form a central line 52 extending along the apex or edge of the dihedral angle formed by the faces 51.

The anvil 42 is maintained in position by a key 53 which rests in slot 32 and has a tight friction fit with the sides thereof. The upper end of key 53 extends above the upper surface of base 30 and engages one of a pair of slots 54 formed in the top and bottom surfaces of anvil 42. The anvil 42 has a small V-shaped notch 55 formed in its top surface for receiving and supporting the specimen 36 that is to be marked. A larger V-shaped notch 56 is formed in the bottom surface of anvil 42 for receiving and supporting specimens of larger diameter. While only one anvil has been illustrated, other anvils can be provided having V-shaped notches of various sizes to accommodate specimens of a wide range of sizes.

To support the marking arm 44, a standard 58 is mounted on base 30 adjacent to anvil 42. The standard has flanges 60 extending downwardly therefrom into slot 32 for positioning the standard. A bolt has its head 62 resting in a cavity 63 in the upper surface of standard 58 and its shank 64 extending downwardly through a hole in standard 58 into slot 32. A nut 66 is threaded onto the lower end of shank 64 and rests in the enlarged lower portion of T-shaped slot 32. A pair of spaced pillars 68 are formed integrally with the standard 58 and extend upwardly from opposite ends thereof. An axle 70 is secured to the pillars 68 and extends horizontally therebetween. The marking arm 44 has a slot 72 formed in its rear face 74. The axle 70 extends through an aperture formed in the rear portion of marking arm 44 so that the marking arm is freely pivotable about the axle 70.

The marking knives 48 are releasably held at a variable distance from each other in a slot formed in the lower surface of marking arm 44 by means of knife assembly shown exploded in FIG. 4. The knife assembly includes a marking block 76, a spacer block 78, marking knives 48, and a wedge 80. The marking block 76 comprises a plate portion 82 having a threaded hole 84 formed in the center thereof. As seen in FIGS. 2 and 3, a thumb screw 85 extends downwardly through a threaded hole in marking arm 44 and engages the threaded hole 84 in plate portion 82 of marking block 76 to releasably hold the knife assembly in the slot formed in the lower surface of marking arm 44. The thumbscrew includes an enlarged knurled head for manual turning and a threaded shank.

The marking block 76 provides a space in which are held the spacer block 78, the marking knives 48, and the wedge 80. The marking block 76 has a straight flange 86 extending downwardly from one end of plate portion 82. A tapered flange 88 extends downwardly from the opposite end of plate portion 82 and has a wide end 90 tapering to a narrow end 92. The spacer block 78, marking blades 48, and wedge 80 are forced into the space between flange 86 and flange 88 and held therein by friction. The length of the spacer block 78 is selected to provide the desired spacing of the marking knives 48 and hence the desired spacing of the indentation 34 and 35 formed by the knives on specimen 36.

The spacing of the indentations formed on the specimen can be varied or adjusted as desired by employing a spacer block, wedge, and marking block of different dimensions.

To provide for operating the marker 20 to form the indentations on the specimen, the manual lifting knob 46 is releasably secured in the front end of marking arm 44 by a threaded shank 94.

After the specimen is marked with spaced identations by marker 20, the specimen is then drawn or extended by a conventional machine (not shown) having two jaws each of which grasps one of the enlarged end portions 39 and 40 of the specimen. Such machines include mechanism for pulling the jaws apart to elongate the specimen until fracture occurs along the line 96 shown in the lower portion of FIG. 5.

After fracture, the two broken pieces are matched manually by mating the portions of the red line 41 on each of the broken pieces. The mated broken pieces are shown in the lower portion of FIG. 5. It will be seen that the elongation of the specimen has moved the indentations 34 and 35 farther apart. The increase or increment in the distance between the indentations is the elongation or strain of the specimen.

The holders 22 and 24 are provided further to match the broken pieces of the specimen and also firmly to hold the specimen so that the reader 26 can accurately and precisely read the elongation of the specimen. As seen in FIG. 1, the specimen has one end received in the conical recess 98 in center 100 and its opposite end received in the conical recess 102 in center 104. The center 104 is secured to the end of a spindle 106 slidably received in a slot in the top surface of tailstock 108.

To provide for adjustably and firmly holding the tailstock 108 in position on the base 30, flanges 110 extend downwardly from the bottom surface of tailstock 108 and engage the sides of slot 32. The tailstock 108 has a cavity 112 formed in one side thereof to permit adjustment of a bolt having a head 114 and a threaded shank 115 extending downwardly through a washer 116 and an aperture in the lower part of tailstock 108 and into slot 32. A nut 118 is positioned in the enlarged lower portion of T-shaped slot 32 and engages the threaded lower end of bolt shank 115 to releasably and firmly hold the tailstock 108 at a position on the base 30. By releasing the bolt, the tailstock 108 can be moved along the base 30 to accommodate specimens of various sizes.

In order that the specimen can be firmly gripped between centers 100 and 104, mechanism is provided for moving the center 104 and spindle 106 horizontally with respect to the tailstock 108. As seen in FIG. 8, a slot 120 is formed in the rear lower surface of spindle 106. A thumbscrew has a threaded shank 122 threadedly engaging an aperture in tailstock 108, a flange 124 extending outwardly from the shank and extending into the slot 120, and a knurled operating knob 126. By rotating knob 126, the flange 124 will be moved in the direction of the axis of shank 122. By the engagement of the flange 124 in the slot 120, the spindle 106 and center 104 will be moved horizontally with respect to tailstock 108.

The holder 24 includes apparatus for holding end 39 of the specimen 36 and for striking that end an axial blow of controlled force to press the broken pieces of the specimen together along the fracture line 96 and achieve orientation and matching of the broken pieces.

Referring to FIGS. 1, 2, 6, and 7, the center 100 is secured to the end of a spindle 128 slidably received in a horizontal aperture in tailstock 130. Spaced rack teeth 132 are formed in the spindle 128. For moving the spindle 128 and the center 100 to the left as seen in FIG. 5, and thereby cocking the center for subsequent delivery of the blow to the specimen, a rod 134 is rotatably positioned in a vertical hole in tailstock 130 and has pinion gear teeth 136 formed on its lower portion and engaging rack teeth 132 of spindle 128. The rod 134 has a diminished stud portion 138 extending from its bottom and rotatably positioned in a diminished hole formed in the tailstock 130.

To releasably hold the rod 134 in the tailstock 130, a groove 140 is formed in the stud portion 138. A set screw 142 threadedly engages a horizontal aperture in tailstock 130 and extends into groove 140 to releasably prevent the removal of rod 134 from the tailstock. The set screw 142 is not tightly pressed into the groove 140, but is only loosely positioned therein, so that the rod 134 can be freely rotated by an operating handle 144 extending horizontally from the upper end thereof.

A stud 146 extends integrally from the left end of spindle 128 and is surrounded by a sleeve 148 pressing against the end of spindle 128. The sleeve 148, spindle 128 and center 100 are urged to the right, as seen in FIGS. 2 and 6, by a selected number of constant-force springs 150 having coil portions 152, inner leg portions 154 hooked at the ends to engage sleeve 148, and outer leg portions 156 hooked at the ends to engage the interior of a cap 158 threadedly engaging an aperture formed in tailstock 130 concentric with the spindle 128. The leg portions 154 and 156 extend through slots 160 formed in cap 158.

The springs 150 serve both to deliver the controlled-force axial blow to the broken specimen pieces and to hold the specimen 36 between centers 100 and 104 for subsequent reading of the elongation of the specimen.

In the illustrated embodiment, six springs 150 are employed to impel the center 100 against end 39 of the broken specimen pieces so that the broken surfaces of the specimen pieces will be forced into matching engagement along the fracture line 96. The number of springs 150 employed will depend upon the weight and size of the specimen being measured. If a lighter specimen is being measured, some of the springs 150 will be removed so that a blow will be struck on the end of the specimen sufficient to insure matching of the broken surfaces but not so great as to knock the broken specimen pieces out of alignment. The spring employed must be sufficient to overcome the friction of spindle 128 in tailstock 130 as well as deliver the blow.

To provide for adjustably securing the tailstock 130 in position on the base 30, flanges 162 extend downwardly from the bottom surface of tailstock 130 and engage the sides of slot 32 in base 30. Also, the tailstock has a cavity 164 formed in one side thereof to permit adjustment of a bolt having a head 166 and a threaded shank 168 extending downwardly through a washer 170 and an aperture in the lower part of tailstock 130 and into slot 32. A nut 172 is positioned in the enlarged lower portion of T-shaped slot 32 and engages the threaded lower end of bolt shank 168 to releasably and firmly hold the tailstock 130 at a position on the base 30. By releasing the bolt, the tailstock 130 can be moved along the base 30 to accommodate specimens 36 of various sizes.

With the broken pieces of the specimen 36 held matched and oriented by the holders 22 and 24, the elongation reader 26 is manipulated to read the elongation of the specimen. First, mechanism is provided to move microscope 28 along a path parallel to the length of the specimen 36 until the center line 52 of the right-hand indentation 35 is aligned, as viewed by the operator looking through the eyepiece 174 of the microscope 28, with the zero indicium on the graticule or scale 176 having indicia from 0 to 150 and mounted in eyepiece 174 of microscope 28, as seen in FIG. 15. The device is proportioned and calibrated so that the graticule indicia 0–150 represent thousandths of an inch of elongation of the specimen 36.

Next, apparatus is provided to move the microscope 28 further, to the left as seen in FIG. 1, along the path parallel to the length of the specimen 36, a distance equal to the distance separating the cutting edges 50 of the marking knives 48 and hence equal to the distance between the center lines 52 of the indentations 34 and 35 in the upper portion of FIG. 5, before the specimen was elongated. At this time, the operator looks through the eyepiece 174 and sees the center line 52 of the left-hand indentation 34 on the specimen appearing at a point on the graticule 176. The point at which the center line 52 of the left-hand indentation 34 appears on the graticule is a direct reading of the elongation of the specimen.

To provide mechanism to move the elongation reader 26 to align the zero indicium on the graticule 176 with the center line 52 of the right-hand indentation 35 on the specimen, the reader 26 is slidably mounted on foundation 178 secured by screws 180 to a plate 182 extending over slot 32 in base 30.

Referring to FIGS. 2 and 10, in order to firmly position the foundation 178 and plate 182 on the base 30, flanges 184 are provided extending downwardly from plate 182 and engaging the sides of slot 32. A thumbscrew has a knurled operating knob 186 and a threaded shank 188 extending downwardly into slot 32. A nut 190 is positioned in the enlarged lower portion of T-shaped slot 32 and engages the threaded lower end of shank 188. By releasing the thumbscrew, the plate 182, the foundation 178 and the elongation reader 26 supported thereby, can be all moved as a unit to a new position on the base 30.

Referring to FIGS. 9 to 14, the foundation 178 includes a body portion 192, an upper wedge-shaped portion 194 of diminished width and having outwardly-beveled sides 196 and 198, and a horizontal ledge portion 200. An intermediate support 202 is slidably mounted on foundation 178. To move the intermediate support 202 along the foundation 178, a spindle 204 extends through a bore 206 formed in the foundation 178. The spindle has one end 208 rotatably journaled in an aperture in a transverse wall 210 extending partially across bore 206. At its opposite end 212, the spindle 204 is rotatably journaled in bearing block 214 secured to the end of foundation 178. The spindle 204 has a stud portion 216 extending from end 212 and secured to the transverse rod 218. The rod has a handle 220 attached to one end thereof and a counterweight 222 attached to the opposite end thereof.

The spindle 204 has a threaded worm gear portion 224 engaging threads formed on the inner side of a key 226 positioned in a slot in flange 228 of intermediate support 202. The key 226 extends over ledge portion 200 and through an aperture 230, seen in FIG. 12, formed in the foundation 178 and communicating with the bore 206. As seen in FIG. 14, the key 226 is held by a releasable friction fit in a slot formed between the end portion 232 and main portion 233 of flange 228.

When the handle 220 is rotated in either direction, the worm gear 224 moves the key 226 in the direction corresponding to the direction of rotation of handle 220. Thus, the key 226, the intermediate support 202, and all the structure supported thereabove, including the microscope 28, are moved along a path parallel to the length of the specimen 36. By this rotation of handle 220, the microscope 28 can be moved until the operator, looking through the eyepiece 174, sees the center line 52 of the right-hand indentation 35 aligned with the zero indicium on graticule 176.

Referring to FIGS. 1 and 11, an extension 234 secured to the foundation 178 has an upstanding stop 235 for limiting the movement of the intermediate support 202.

To prevent looseness of fit, a spacer bar 236 is positioned by pin 237 held in place by set screw 238, as seen in FIGS. 10 and 13, between the beveled inner side of flange 228 and the beveled side 196 of the wedge-shaped portion 194 of foundation 178. The pin 237 has a beveled end seated in a depression in the spacer bar 236. The intermediate support 202 has another lower flange 240 having a beveled inner side slidably engaging beveled side 198 of the foundation 178.

Now the apparatus will be described for moving the microscope 28 a distance equal to the distance separating the cutting edges 50 of the marking knives 48. The intermediate support 202 has two upper flanges 242 and 244 having beveled inner sides. A slide 246, which supports the microscope 28 thereabove, is slidably received between the flanges 242 and 244. A spacer bar 247 is positioned between flange 244 and slide 246 to eliminate looseness in the fit of the slide 246 between the flanges 242 and 244. The spacer bar is releasably held in place by a pin 248, shown dotted in FIG. 13, and positioned by a set screw 249.

A cover plate 250 is secured to slide 246 by two end bolts 252 and by screws 254 which extend upwardly into microscope base 256. The microscope barrel 258 is slidably received for reciprocation in an inclined track 260 formed at the top of microscope base 256. To provide for moving the microscope barrel 258 to focus the image of the indentations 34 and 35 on the specimen 36, an inclined rack 262 is formed on the bottom of barrel 258 engaging a pinion 264 rotatably journaled in microscope base 256 and operated by two thumb screws 266 and 268 on opposite sides of the microscope base.

The microscope slide 246 and the microscope 28 mounted thereon are yieldingly urged to the right by two coil springs 270 and 272 formed from wide bands and having ends secured to the bottom of cover plate 250 by rivets 274 and 276, respectively. The springs exert constant force at substantially all positions of uncoiling and are of the type sold under the trademark "NEG-A-TOR." The springs urge the microscope slide 246 to the position shown in FIGS. 1 and 9 where the slide is pressed up against stop bar 278 having its opposite ends secured by screws 279, seen in dotted lines in FIG. 12, to side bar 280 and side bar 282. The side bar 280 is secured to intermediate support 202 by screws 284. Similarly, the side bar 282 is secured to intermediate support 202 by screws 286.

As seen in FIG. 12, the stop bar 278 has an upwardly-extending opening 287 formed in its lower edge so that when the handle 220 is rotated to move the intermediate support 202 and the stop bar 278 moves integrally therewith, the stop bar 278 will pass over bearing block 214. This structural feature assists in extending the possible movement of the intermediate support 202 and the microscope 28 by rotation of handle 220.

Spring 270 is secured to and coiled around a screw 288 threadedly engaging the slide bar 280. Similarly, spring 272 is secured to and coiled around a screw 290 threadedly engaging the side bar 282. To maintain the springs in coils on the screws, retaining plates 292 are secured to the inner ends of the screws 288 and 290.

In measuring the elongation of specimen 36, the operator grasps the microscope base 256 in his hand and, overcoming the force of springs 270 and 272, slides the slide 246, with the microscope 28 mounted thereon, to the left as seen in FIG. 1, so that a gap is formed between the slide 246 and the stop bar 278. Thereupon, a gauge block 294 is inserted in the gap between the slide 246 and the stop bar 278. The gauge block is selected to have a length precisely equal to the initial distance separating the central lines 52 of the indentations 34 and 35.

To align the gauge block in the gap, a bar 296 is secured to stop bar 278 by bolt 298. The bar 296 extends perpendicularly to stop bar 278 to firmly position the rectangular gauge block 294.

Next, the operator releases the microscope base 256 so that the constant-force springs 270 and 272 pull the slide 246 and microscope 28 to the position shown in FIG. 11 where the gauge block 294 has one end face engaging the stop bar 278 and the opposite end face engaging the slide 246. Thus, the microscope 28 has been moved from its former position by a distance equal to the length of gauge block 294. The length of gauge block 294 is equal to the distance separating the cutting edges 50 of knives 48 and hence equal to the initial distance between the center lines 52 of indentations 34 and 35 formed by the marker 20.

It will be understood that, if there had been no elongation of the specimen, the operator, upon looking through the eyepiece 174, would see the center line 52 of the left-hand indentation 34 aligned with the zero indicium on the graticule 176. But, since there has been elongation, the center line 52 of the left-hand indentation 34 is displaced from the zero indicium. The amount of this displacement is the elongation of the specimen 36 and it is read directly by the operator viewing and reading the point where the center line 52 of the left-hand indentation 34 appears on the 0–150-scaled graticule 176.

As stated previously, specimens of various sizes and weights can be measured employing the apparatus of the invention. For each specimen, appropriate dimensions and settings of various parts of the apparatus must be selected and matched with one another. For instance, an anvil 42 must be selected having the proper size V-shaped notch to receive the specimen. Also, the number of springs 150 to be employed in the holder 24 must be selected in accordance with the size and weight of the specimen.

Further, the initial spacing of the indentations 34 and 35 must be selected to give sufficient precision to the measurement of elongation. To provide the selected initial spacing, a marking block 76 and a spacer block 78 of appropriate dimensions must be selected for the marker 20. A gauge block 294 must be selected having a length equal to the initial spacing of the center lines 52 of the indentations 34 and 35. The Johansson brand gauge blocks can be employed as gauge blocks 294.

There now follows a description of the method of the invention and the operation of the apparatus heretofore described. A specimen 36, in the form of an aluminum rod, is placed with its center portion 38 resting in V-shaped notch 54 in anvil 42 of marker 20. The operator then manually raises the lifting knob 46 to pivot the marking arm 44 upwardly around the axle 70. Then the lifting knob is released and the marking arm 44 falls by the force of gravity until marking knives 48 strike the center portion 38 of the specimen 36 and form indentations 34 and 35. The lifting knob 46 is again raised to permit removal of the specimen 36 from the marker 20. A longitudinal line 41 is then placed in red ink on the specimen to facilitate subsequent mating of the broken pieces. The specimen then appears as shown in the upper portion of FIG. 5.

The marked specimen is then placed in a conventional drawing or extending machine (not shown in the drawing) having two jaws each of which grasps one of the enlarged end portions 39 and 40 of the specimen. The extending machine is then operated to pull the jaws apart to elongate the specimen until fracture occurs along the line 96 indicated in the lower portion of FIG. 5.

After fracture, the two broken pieces are matched up manually by mating the portions of the red ink line 41 on each of the broken pieces, as seen in the lower portion of FIG. 5. The increase in the distance between the center lines 52 of indentations 34 and 35 is the elongation of the specimen, now to be measured.

The manually-matched fractured specimen 36 is then placed between holders 22 and 24 so that specimen end 39 is held in conical recess 98 in center 100 and specimen end 40 is held in conical recess 102 in center 104. Thumbscrew knob 126 is then rotated to move center 104, specimen 36, and center 100 until springs 150 are flexed and the fractured specimen is firmly held between the centers 100 and 104.

Next, in order to strike a blow axially along the length of specimen 36 and effect further matching and orientation of the broken specimen pieces, the handle 144 is rotated a short distance to withdraw the center 100, by engagement of the teeth 136 of rod 134 with the rack teeth 132 of spindle 128, a short distance from the specimen end 39, against the force of springs 150. Then the handle 144 is released, whereupon the center 100 and the spindle 128 are snapped back by the force of springs 150 to deliver an axial blow to the specimen pressing the fractured surfaces at fracture line 96 into closer matching engagement.

With the matched pieces of the specimen 36 firmly held between the holders 22 and 24, the elongation reader 26 is manipulated to move the microscope 28 until the zero indicium on graticule 176 is aligned with the center line 52 of the right-hand indentation 35. The operator accomplishes this by looking through the eyepiece 174 and rotating handle 220 until the center line 52 of the right-hand indentation 35 is aligned with the zero indicium on the graticule. The rotation of handle 220 causes a rotation of worm gear 224. By the engagement of the gear teeth on the inner side of key 226 with worm gear 224, the intermediate support 202, the slide 246, and the microscope 28 supported thereabove, are all moved as a unit along foundation 178 in a path parallel to the length of the specimen 36. At this point the right end of the slide 246 is held against the stop bar 278 by springs 270 and 272, as seen in FIGS. 1 and 9.

Next the operator grasps the microscope base 256 and pulls to the left, as seen in FIGS. 1 and 11, to move the slide 246 along the intermediate support 202 and form a gap between the slide 246 and the stop bar 278. The gauge block 294, equal in length to the distance separating the center lines 52 of the initial indentations 34 and 35, is inserted in this gap. Thereafter, the microscope base 256 is released by the operator and the springs 270 and 272 return the slide 246 to the right, as seen in FIGS. 1 and 11, until the slide 246 presses against one end face of the gauge block 294 and the opposite end face of the gauge block 294 presses against the stop bar 278. By this insertion of the gauge block, the microscope 28 has been displaced to the left a distance equal to the initial distance separating the center lines 52 of the indentations 34 and 35 before the specimen 36 was elongated.

The constant-force springs 270 and 272 provide an unchanging pressure between the slide 246 and the stop bar 278 regardless of the presence or absence of a gauge block and regardless of the size of gauge block employed. It is important that these constant-force springs be employed, because a variation in the end pressure between the slide 246 and the stop bar 278 could cause measurable inaccuracy in the elongation readings.

Now, the operator looks through the eyepiece 174 and observes the center line 52 of the left-hand indentation 34 aligned with a point on the 0–150 scale of the graticule 176. This point is a direct reading of the elongation of the specimen 36 in thousandths of an inch.

Thus it will be seen that the invention provides method and apparatus for precisely and accurately measuring the elongation of specimens of material.

While a present preferred embodiment of the invention has been illustrated and described, it will be recognized that the invention may be otherwise variously embodied and practiced within the scope of the following claims.

I claim:

1. A device for reading the elongation of a specimen of material having two spaced marks thereon, said device comprising: a foundation; an intermediate support movably positioned on said foundation; a microscope platform movably positioned on said intermediate support for movement in a path beside the position to be occupied by the specimen, a microscope mounted on said microscope platform and having a graticule calibrated in the units of elongation of the specimen; means for moving said intermediate support along said foundation to a first point where one of the marks on the specimen will be aligned with the zero indicium on said graticule; stop means secured to said intermediate support and extending into the path of movement of said microscope platform; constant-force spring means yieldingly urging said microscope platform against said stop means but permitting the movement of said microscope platform away from said stop means to open a gap between said stop means and said microscope platform; and a gauge block insertable into said gap and having a length equal to the distance initially separating the marks on the specimen prior to elongation; whereby, upon insertion of said gauge block into said gap and release of said microscope platform, said spring means returns said microscope platform and said microscope to a second point where the other mark on said specimen is aligned with a position on said graticule corresponding to the elongation of said specimen.

2. A device as set forth in claim 1 wherein said foundation has a bore formed therein, and including a spindle rotatably positioned in said bore and extending exteriorly of said foundation; a handle secured to the exterior end of said spindle; said spindle having a worm gear portion; and, said intermediate support having a portion with gear teeth meshing with said worm gear portion of said spindle.

3. In a device for reading the elongation of a specimen of material having two spaced marks thereon, the combination of: a foundation; an intermediate support movably positioned on said foundation; a microscope platform movably positioned on said intermediate support for movement in a path beside the position to be occupied by the specimen, a microscope mounted on said microscope platform and having a graticule calibrated in the units of elongation of the specimen; means for moving said intermediate support along said foundation to a first point where one of the marks on the specimen will be aligned with the zero indicium on said graticule; stop means secured to said intermediate support and extending into the path of movement of said microscope platform; and constant-force spring means yieldingly urging said microscope platform against said stop means but permitting the movement of said microscope platform away from said stop means to open a gap between said stop means and said microscope platform.

References Cited in the file of this patent

UNITED STATES PATENTS

| | | |
|---|---|---|
| 594,186 | Walter | Nov. 23, 1897 |
| 637,769 | Earle | Nov. 28, 1899 |
| 1,959,537 | Kune | May 22, 1934 |
| 2,050,186 | Klemperer | Aug. 4, 1936 |
| 2,237,515 | Williams | Apr. 8, 1941 |
| 2,363,964 | Howson et al. | Nov. 28, 1944 |
| 2,424,338 | Sonntag | July 22, 1947 |
| 2,644,226 | Elliott | July 7, 1953 |
| 2,920,383 | Azdelott | Jan. 12, 1960 |
| 3,016,777 | Garombo | Jan. 16, 1962 |

FOREIGN PATENTS

| | | |
|---|---|---|
| 456,937 | Canada | May 24, 1949 |